Aug. 18, 1953   E. M. KELLY ET AL   2,648,857
APPARATUS FOR CLEANING A SIGHT GLASS AND THE LIKE
Filed March 23, 1950
FIG.1
FIG.2
FIG.3
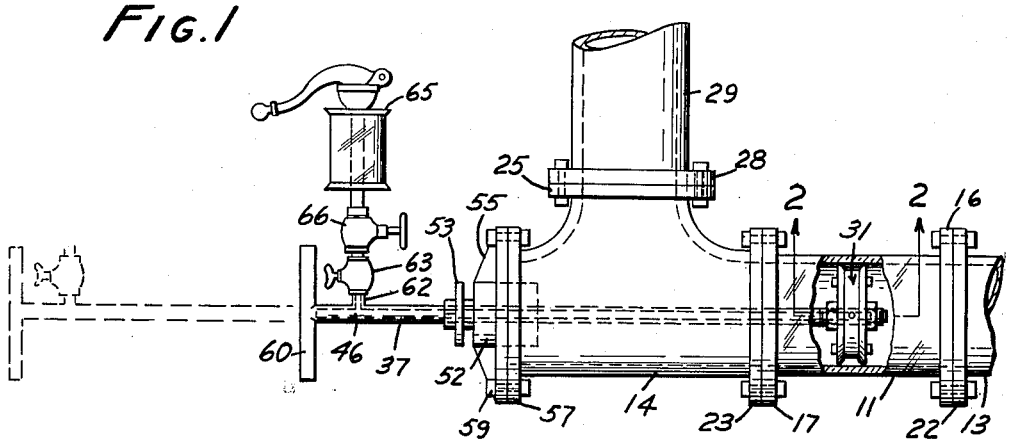
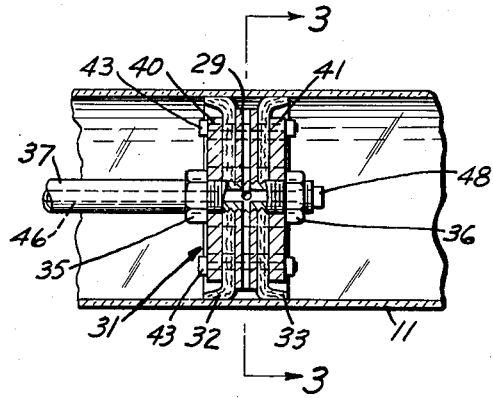
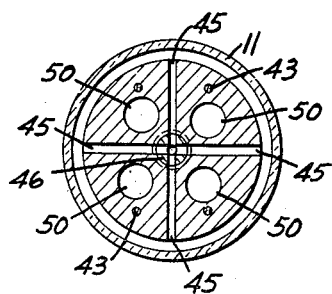
INVENTORS:
EARL M KELLY,
BY SAMUEL I. BOUSMAN,
James B. Christie
ATTORNEY.

Patented Aug. 18, 1953

2,648,857

UNITED STATES PATENT OFFICE

2,648,857

APPARATUS FOR CLEANING A SIGHT GLASS AND THE LIKE

Earl M. Kelly, Millbrae, and Samuel I. Bousman, Mountain View, Calif., assignors to Process Engineers Incorporated, a corporation of California Application March 23, 1950, Serial No. 151,466

3 Claims. (Cl. 15—104.16)

This invention is concerned with sight glass cleaners and provides an improved cleaner which is simple, inexpensive to construct and effective in operation. In its preferred form, the sight glass cleaner is particularly applicable, although not limited, to use in a flowing fluid line.

In many industries e. g., in the treatment of sewage, it is desirable to know the characteristics of a fluid flowing in the line. To this end a sight glass or window is installed, thus enabling an operator to view the contents of the line. This arrangement is satisfactory for a fluid having no oleaginous material or other film forming constituents but oftentimes, e. g., in the treatment of sewage containing oils, fats, etc., the sight glass becomes opaque with the coating over its inner surface.

To overcome this difficulty we provide means which permits easy and ready cleaning of the coated inner surface of the sight glass without interruption of flow therein. The cleaning means of our invention includes a wiper slidable along the inner wall of the sight glass. An actuating arm connected to the wiper extends from the wiper to the exterior of the sight glass assembly. Means are provided for introducing a solvent to the wiper through the arm. The arm is slidable along the axis of the glass.

In a sight glass cleaner adapted for use in a flowing fluid line, we prefer to provide a compartment associated with the line for storing the wiper when not in use. Preferably, a T is coupled in the fluid line, the flow being through one of the legs and the stem of the T. The other leg of the T serves as a storage compartment for the wiper when it is not in use. When the wiper is stored in the leg, the line is clear for the flow of fluid.

In our preferred embodiment of the invention, a head to which the wiper is affixed has at least one transverse hole. This hole permits the passage of the fluid through the head, thereby reducing piston action by the head upon the fluid with the movement of the arm by the operator and also lessening, in the event the sight glass carries a flowing stream, the force of the fluid upon the moving head. Of course, in the case of an excessive fluid pressure, it would be necessary for the operator to cut off the fluid stream.

Preferably, a pair of spaced wipers are affixed to the head. The solvent is introduced through a bore of the arm to a radial hole of the head, and thence to the space between the wipers. The operator by moving the actuating arm back and forth may subject the whole of the inner surface of the sight glass to the action of the solvent and wipers.

The cleaner of the invention is not limited in its use to the cleaning of a sight glass installed in a flowing fluid line but is equally adaptable to the cleaning of a sight glass otherwise employed, e. g. as a level indicator in a static line.

The invention will be clearly understood from the following detailed description of a presently preferred form thereof. The description is illustrated by the accompanying drawing in which:

Fig. 1 is a side elevation, partly cut away, of a sight glass equipped with the cleaner of our invention;

Fig. 2 is a sectional view along line 2—2 of the apparatus of Fig. 1, showing in detail the wiper and the wiper head;

Fig. 3 is a sectional view along the line 3—3 of the apparatus of Fig. 2, showing in particular a central disc of the wiper head.

As shown in Fig. 1, the apparatus has a tubular sight glass or window 11, capable of withstanding considerable fluid pressure, coupled between an inlet pipe 13 of a fluid line and one leg of a T 14. Two cast iron flanges 16, 17 are mounted on the exterior of the sight glass and bolted to the integrally built flanges 22, 23 of the inlet pipe and of the T, so as to form leak-proof joints.

A flange 25 of the stem of the T is bolted to an integrally built flange 28 of a pipe 29 of the fluid line to form a tight seal.

A head 31 with a pair of wipers 32, 33 (which slidably engage the inner wall of the sight glass) is positioned by nuts 35, 36 on the threaded end of an elongated actuating tube or arm 37 extending axially of the sight glass. The head is composed of a central disc 29 with one of the wipers abutting each side of the disc, and a pair of outer clamp discs 40, 41. The three discs and the two wipers have four sets of aligned holes through which bolts 43 pass, holding the assembled head together.

The central disc has four radial holes 45 which open into a bore 46 of the tubular arm. The end of the tubular arm is closed by a plug 48.

The head has four relatively large transverse holes 50 which permit the passage of fluid through the head. These transverse holes lessen the force of a flowing stream upon the head and also reduce piston action by the head upon the fluid.

The actuating arm passes through a bearing 52 and a packing gland 53, both supported in a flange 55, to the exterior of the line. This flange is bolted to an integrally built flange 57 of the second leg of the T. The arm terminates in a handle 60. By moving the handle back and forth the arm slides in the gland and the wipers slide in the sight glass.

A lateral connection 62, opening into the bore of the arm adjacent the handle, carries a valve 63. A solvent pressure gun or pump 65 and associated valve 66 are detachably coupled to the first valve. The same gun may be used at several sight glass stations.

Cleaning of the sight glass is accomplished by manually moving the arm inwardly and outwardly. Preferably, the assembly is coupled in the fluid line with the arm in a vertical position; in this event, cleaning would proceed by raising and lowering the handle.

If movement of the wipers alone fails to remove the coating on the inner surface of the glass sight, the pressure gun or pump is coupled to the arm, the two valves are opened, and solvent is forced under pressure through the bore of the arm to the radial holes of the central disc of the head, and thence to the space between the wipers. The operator then moves the wipers the length of the sight glass and exposes the coating to the solvent. Movement of the head and injection of the solvent is continued until the coating is removed.

With the removal of the coating, the head and arm are pulled to the extreme left position as shown in Fig. 1, thereby completely clearing the line to fluid flow. The force of the flowing fluid assures that the head and arm will remain in this far left position, eliminating the need of a locking means. The uncoupled leg of the T, i. e. the one with the packing gland, is large enough to contain the wiper head assembly when it is not in use.

We claim:

1. In a fluid line equipped with a sight glass, the combination which comprises a piston having a supporting disk and two wiper disks larger than the supporting disk having their edges adapted to be positioned in slidable engagement with the sight glass and disposed in spaced relationship with respect to one another on opposite sides of the supporting disk and fastened thereto, the piston being adapted to slide longitudinally within the sight glass, there being an annular space defined by the outer edge of the supporting disk and the sides of the wiper disks, a conduit for fluid passing through the three disks in the direction of the axis of the piston from one side of the piston to the other, an actuating tube fastened to the supporting disk and extending from the supporting disk in the direction of the axis of the piston with one end adapted to project through the fluid line, a conduit in the supporting disk connecting the actuating tube with the annular space, and means for introducing a solvent into the annular space through the actuating tube and the conduit in the supporting disk.

2. In a fluid line equipped with a sight glass, the combination which comprises a piston having a supporting disk and two wiper disks larger than the supporting disk having their edges adapted to be positioned in slidable engagement with the sight glass and disposed in spaced relationship with respect to one another on opposite sides of the supporting disk and fastened thereto, the piston being adapted to slide longitudinally within the sight glass, there being an annular space defined by the outer edge of the supporting disk and the sides of the wiper disks, a conduit for fluid passing through the three disks in the direction of the axis of the piston from one side of the piston to the other, a slidable actuating tube fastened to the supporting disk and extending from the supporting disk in the direction of the axis of the piston with one end adapted to project through the fluid line, a conduit in the supporting disk connecting the actuating tube with the annular space, and pumping means attached to the actuating tube and adapted to be positioned outside the fluid line for forcing a solvent into the annular space through the tube and the conduit in the supporting disk.

3. In a fluid line equipped with a sight glass, the combination which comprises a piston having a supporting disk and two wiper disks larger than the supporting disk having their edges adapted to be positioned in slidable engagement with the sight glass and disposed in spaced relationship with respect to one another on opposite sides of the supporting disk and fastened thereto, the piston being adapted to slide longitudinally within the sight glass, there being an annular space defined by the outer edge of the supporting disk and the sides of the wiper disks, a conduit for fluid passing through the three disks in the direction of the axis of the piston from one side of the piston to the other, a slidable actuating tube fastened to the supporting disk and extending from the supporting disk in the direction of the axis of the piston with one end adapted to project through the fluid line, a conduit in the supporting disk connecting the actuating tube with the annular space, pumping means detachably connected to the actuating tube and adapted to be positioned outside the fluid line for introducing a solvent into the annular space through the actuating tube and the conduit in the supporting disk, and a valve disposed between the pumping means and the actuating tube.

EARL M. KELLY.
SAMUEL I. BOUSMAN.

References Cited in the file of this patent

UNITED STATES PATENTS

| Number | Name | Date |
|---|---|---|
| 247,541 | Davis | Sept. 27, 1881 |
| 405,015 | Crance | June 11, 1889 |
| 640,442 | Clarke | Jan. 2, 1900 |
| 1,252,656 | Breen | Jan. 8, 1918 |
| 1,321,490 | Sweetland | Nov. 11, 1919 |
| 1,510,581 | Boynton | Oct. 7, 1924 |
| 2,367,900 | Stine | Jan. 23, 1945 |